United States Patent
Wei et al.

(10) Patent No.: US 10,523,770 B2
(45) Date of Patent: Dec. 31, 2019

(54) PROGRESS TRACKING FOR REQUESTS MADE THROUGH AN INTERMEDIARY

(71) Applicant: Microsoft Technology Licensing, LLC, Redmond, WA (US)

(72) Inventors: Yawen Wei, Sunnyvale, CA (US); Kaiyang Liu, Bellevue, WA (US); Jie Xiao, Sunnyvale, CA (US); Siyu You, Santa Clara, CA (US); Dayun Li, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 15/445,791

(22) Filed: Feb. 28, 2017

(65) Prior Publication Data

US 2018/0248964 A1    Aug. 30, 2018

(51) Int. Cl.
*G06F 15/16* (2006.01)
*H04L 29/08* (2006.01)
*H04L 12/725* (2013.01)

(52) U.S. Cl.
CPC ............ *H04L 67/22* (2013.01); *H04L 67/146* (2013.01); *H04L 67/18* (2013.01); *H04L 67/28* (2013.01); *H04L 45/306* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 6,928,462 B2* | 8/2005 | Jia | .......................... | G06F 9/5044 709/202 |
| 6,938,096 B1* | 8/2005 | Greschler | ................. | G06F 8/60 709/217 |
| 7,577,759 B2* | 8/2009 | Rosu | ....................... | H04L 69/02 709/250 |
| 9,712,412 B2* | 7/2017 | Schlack | .............. | H04L 43/0817 |
| 2002/0026359 A1* | 2/2002 | Long | ....................... | G06Q 30/02 705/14.26 |
| 2013/0339509 A1* | 12/2013 | Johnson | .................. | H04L 41/14 709/223 |
| 2014/0365564 A1* | 12/2014 | Krishnamurthy | ...... | G06Q 30/02 709/203 |

* cited by examiner

*Primary Examiner* — Alicia Baturay
(74) *Attorney, Agent, or Firm* — Hickman Palermo Becker Bingham LLP

(57) ABSTRACT

A request intermediary processing system which implements techniques to allow tracking of responses to requests when there is an intermediary. In an embodiment, the intermediary includes an internal exchange. The internal exchange may manage one or more content item providers and select content items from among the one or more internal content item providers to respond to requests. The intermediary may include, when responding to a request, inserting or embedding a token or other means so that the integrity of a content item provider-specific tracking data is maintained, while including request intermediary processing system-specific tracking data.

20 Claims, 4 Drawing Sheets

PROGRESS TRACKING FOR REQUESTS MADE THROUGH AN INTERMEDIARY

TECHNICAL FIELD

The present disclosure relates to observing outcomes to requests and, more specifically, observing outcomes to requests made through an intermediary. SUGGESTED GROUP ART UNIT: 2447; SUGGESTED CLASSIFICATION: 709/224.

RELATED CASES

This application is related to the following applications: (1) U.S. patent application Ser. No. 15/445,451, "Increasing Coverage of Responses for Requests through Selecting Multiple Content Items," filed on Feb. 28, 2017; (2) U.S. patent application Ser. No. 15/445,781, "Multi-Step Validation of Content Items based on Dynamic Publisher Requirements," filed on Feb. 28, 2017; (3) U.S. patent application Ser. No. 15/445,715, "Using Status Indicators in an Item Caching Environment," filed on Feb. 28, 2017; and (4) U.S. patent application Ser. No. 15/445,742, "Reducing Load to Downstream Services by Filtering Requests," filed on Feb 28, 2017. These applications are hereby incorporated by reference in their entirety, for all purposes.

BACKGROUND

The availability of various content items on the Internet allows access to information in bulk. However, the sheer volume of content items available does not increase the usefulness of the content items. The information presented in the content items themselves must be suitable for each particular user. For example, providing content items with information on living and style may be irrelevant to a user interested in learning about current political developments, even though the same content items may be enjoyable for another user.

However, the fragmented nature of content from many different content item providers, as well as the number of exchanges where requests may originate, complicates the handling of requests. For example, it is difficult for a request processing system to consolidate all the content items from a variety of content item providers to respond to requests and understand whether outcomes to the requests were successful. Further, because there may be one or more exchanges where requests originate, it is difficult to scale the request processing system to respond to the sheer quantity of requests from more than one exchange at a time. Oftentimes, the request processing system becomes unable to accommodate every request, as the volume of requests may exceed the throughput of the request processing system. This problem is compounded when the request processing system would like to maintain a minimum level of service to each exchange, as overall service capacity may be severely exhausted.

Therefore, it is desirable to improve the throughput of request processing systems, while allowing understanding of the outcomes of responses to requests.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
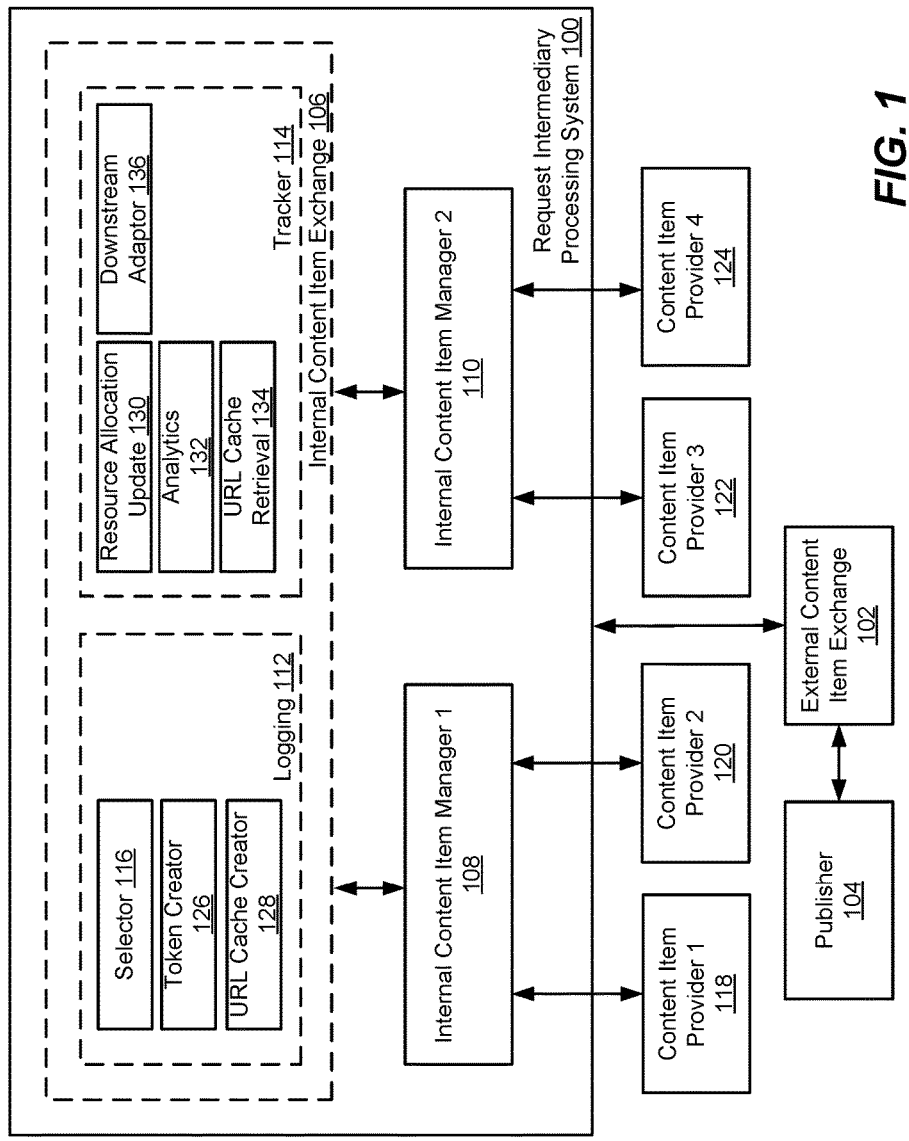
FIG. 1 illustrates a request intermediary processing system in which the techniques described may be practiced according to certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline. The outline and headings used in the outline are provided merely for reference purposes. Features discussed following each heading do not limit the features as being required by a specific embodiment identified by each heading and do not limit the features as solely belonging to any specific embodiment identified by each heading.

1.0 GENERAL OVERVIEW
   1.1 EXAMPLE EMBODIMENT OF A REQUEST INTERMEDIARY PROCESSING SYSTEM
2.0 STRUCTURAL OVERVIEW
   2.1 LOGGING COMPONENT
      2.1.1 PROVIDER-SPECIFIC TOKEN
      2.1.2 REQUEST INTERMEDIARY PROCESSING SYSTEM-SPECIFIC TOKEN
   2.2 TRACKER COMPONENT
   2.3 RELATED SYSTEMS USABLE WITH A REQUEST INTERMEDIARY PROCESSING SYSTEM
3.0 EXAMPLE METHOD FOR LOGGING IN A REQUEST INTERMEDIARY PROCESSING SYSTEM
4.0 EXAMPLE METHOD FOR TRACKING IN A REQUEST INTERMEDIARY PROCESSING SYSTEM
5.0 IMPLEMENTATION EXAMPLE—HARDWARE OVERVIEW 1.0 General Overview A request intermediary processing system is described herein which implements techniques to allow tracking of responses to requests when there is an intermediary. In an embodiment, the intermediary includes an internal exchange. The internal exchange may manage one or more internal content item providers and select content items from among the one or more internal content item providers to respond to requests. The intermediary may include, when responding to a request, inserting or embedding a token or other means so that the integrity of a content item provider-specific tracking data is maintained, while including request intermediary processing system-specific tracking data.

Responses to requests include sufficient information to allow the request intermediary processing system to track and understand outcomes of the responses. For example, responses may include information that, when triggered, allows reporting of outcome information to the request intermediary processing system.

1.1 Example Embodiment of a Request Intermediary Processing System

In an embodiment, a request intermediary processing system includes methods and techniques to facilitate tracking of requests made through an intermediary. For example, the intermediary may include an internal content item exchange that manages requests and responses to requests for content items. The request intermediary processing system receives, from an external exchange, over a network, at an internal exchange, a request for a content item. The external exchange may be controlled by an entity different than an entity that controls the request intermediary processing system. For example, the external exchange may be a third-party content item exchange that transmits information on requests for content items to the request intermediary processing system. The internal exchange handles requests from the external exchange for content items that may be satisfied by content item campaigns managed by each respective internal content item manager.

The internal exchange may select a first internal content item manager to satisfy the request. For example, the internal exchange may be communicatively coupled to more than one internal content item managers. Each internal content item manager is associated with multiple content item campaigns. Further, each content item campaign may be associated with only one internal content item manager. In an embodiment, internal content item managers are organized according to one or more categories of content item campaigns that they manage. The categories may be divided into one or more media types of content items provided by each respective internal content item manager.

After the first internal content item manager has been selected, the first internal content item manager identifies a first content item campaign that satisfies the request. For example, the first content item campaign may comply with targeting criteria specified by the request or technical requirements for a content item to satisfy the request.

The request intermediary processing system may generate a response to the request including information identifying the first content item campaign. The response may be an HTTP-formatted response. The response may be created by inserting, into the response from the first content item manager to generate an updated response, internal exchange specified information that includes at least two request identifiers: (1) an external exchange-specific request identifier provided by the external exchange and (2) an internal content item manager-specific identifier created by the internal content item manager.

These two request identifiers may be used to track an outcome based on the updated response. For example, the external exchange-specific request identifier may be provided by the request intermediary processing system to the external exchange to produce outcome information and the internal content item manager-specific identifier may be used to identify and transmit outcome information regarding the first content item campaign. Some examples of outcomes may include whether the updated response resulted in a conversion, a click-through, an impression, or other outcome. The internal exchange identifier may be an identifier usable by the request intermediary processing system to track from which content item provider the content item originated. The updated response may be transmitted to the external exchange. For example, the response may be transformed from a first response that may be executed by a computing device to respond to a request on how a particular response to a request to a second response that achieves the same purpose, but included with additional information that identifies the content item provider even with the intermediary.

In an embodiment, the request intermediary processing system provides, in the updated response, identifying information that allows the request intermediary processing system to track the outcomes of the updated response. For example, identifying information from a content item provider may be different than the identifying information included by the request intermediary processing system. The content item provider-specific information may be in a content item provider-specific format that the request intermediary processing system includes with the updated response, but cannot be understood by the request intermediary processing system. The first internal content item manager may be able to track outcomes of the updated response using the internal exchange specific information, without using the provider-specific information.

Embodiments of the request intermediary processing system may include selecting more than one internal content item manager to respond to a request. For example, the internal exchange may determine that a second internal content item manager may satisfy the request, but select the first internal content item manager instead of the second internal content item manager to use to respond to the request. The internal exchange may determine that, based on requirements included with the request, the first internal content item manager complies with more of the requirements than the second internal content item manager.

In various embodiments, the request intermediary processing system selects which internal content item manager to handle a request based, at least in part, on which internal content item manager may respond to the request quickest. For example, the physical proximity of an internal content item manager may be a factor in determining which internal content item manager is used. Distances between a first server hosting the first content item manager and a second server hosting a second content item manager to a server hosting the external exchange are calculated. The distance may be a measure of geographic distance (e.g., as the crow flies), a number of networks or communication links between servers, or a measure of elapsed travel time for a message from the servers of the first or second internal content item managers to servers of the external exchange.

The request intermediary processing system may use a variety of techniques to maintain a persistent connection with an external exchange. For example, the internal exchange may transmit, to the external exchange, at least one keep alive message. The keep alive message is not transmitted to the external change as part of any specific request, but instead used to maintain the connection of the internal exchange and the external exchange to avoid timeouts for the connection between the internal exchange and the external exchange.

In an embodiment, the request intermediary processing system includes a reporting feature that presents information on the outcomes of multiple responses to requests. For example, the request intermediary processing system receives, from another external exchange, over the network, at the internal exchange, a second request for a content item. The other external exchange may be any other exchange capable of providing requests for content items to the request intermediary processing system. The internal exchange determines that a second internal content item manager may satisfy the second request. The second internal content item manager determines that a second content item campaign satisfies the second request and generates a second response that includes second information identifying the second content item campaign. Before transmitting the second response to the second exchange for the second request, the request intermediary processing system inserts, into the second response to generate a second updated response, second internal exchange specific information that includes a second content item manager identifier that identifies the second internal content item manager. The request intermediary processing system may provide a dashboard presenting information on the success of responses from the first and second internal content item managers. For example, based on first tracking data that indicates whether the first updated response was presented on a client device, calculating a first metric (e.g., a click-through rate, number of impressions) for the first internal content item manager and, based on second tracking data that indicates whether the second updated response was presented on a client device, calculating a second metric for the second internal content item manager. The request intermediary processing system may determine metrics for whether the first or second internal content item manager were successful and offer a comparison analysis of the success rates of the first and second internal content item managers. For example, the success rates of the first and second internal content item managers may be presented concurrently on a screen of a computing device. The screen may also include visualizations, such as pie-charts, bar-graphs, or other visualizations that assist in the comprehension of the success rates.

2.0 Structural Overview

FIG. 1 illustrates a request intermediary processing system 100 in which one or more of techniques described herein may be practiced according to certain embodiments. The request intermediary processing system 100 is a computer-based system. The various components of the request intermediary processing system 100 are implemented at least partially in hardware at one or more computing devices, such as one or more hardware processors executing instructions stored in one or more memories for performing various functions described herein. Descriptions of various components (or modules) as described in this application may be interpreted as providing pseudocode, an informal high-level description of one or more computer structures. The descriptions of the components may be converted into software code, including code executable by an electronic processor. The request intermediary processing system 100 illustrates only one of many possible arrangements of components configured to perform the functionality described herein. Other arrangements may include fewer or different components, and the division of work between the components may vary depending on the arrangement.

The request intermediary processing system 100 may be responsible for consolidating information from one or more external content item exchanges, such as an external content item exchange 102. The external content item exchange 102 represents an entity that supplies requests for content items to the request intermediary processing system 100.

An external content item exchange is a clearinghouse for content item requests. Instead of being directly responsible for determining how or what should be returned in response to a request, the external exchanges facilitate the selection and transmission of information used to respond to requests. The external content item exchange 102 is an exchange that is controlled and managed by an entity different than an entity that operates the request intermediary processing system 100.

There may be one or more external content item exchanges that provide requests to the request intermediary processing system 100 that are not shown in FIG. 1. For example, the external content item exchange 102 may be a real-time bidding (RTB) content item exchange. The RTB content item exchange allows different parties to bid for impressions on one or more Web pages. A winner of a bid obtains the right to include the winner's content item on the one or more Web pages. The winner of the bid may be any party that offers that highest value to the external content item exchange 102, such as revenue, content item suitability, or other factors determined by the external content item exchange 102. Each external content item exchange may provide, to the request intermediary processing system 100, requests for one or more different media item types. A single external content item exchange may provide requests for video, text, graphical, native video, native text, native graphical, or any combination of these content media item types. Requests may be received by the request intermediary processing system 100 at the same or nearly the same time as another request.

Requests for content items may originate from one or more publishers, such as publisher 104. A publisher is an entity that contains inventory where content items may be displayed and that interacts with the external content item exchange 102 over a network. For example, if a user attempts to access a Web page or application that requests content from an online source, the online source may be a publisher that, in turn, communicates, over a network to the external content item exchange 102, a request for a content item.

The request intermediary processing system 100 may include one or more internal content item exchanges. An internal content item exchange 106 is shown in FIG. 1. Each internal content item exchange of the request intermediary processing system 100 is responsible for managing two or more different internal content item managers, such as the internal content item exchange 106 managing an internal content item manager 1 108 and an internal content item manager 2 110. Although two internal content item managers are shown in FIG. 1, any number of internal content item managers may be included. The internal content item exchange 106 may include various components including a logging component 112 and a tracker component 114, as described in greater detail as follows.

2.1 Logging Component

Logging component 112 includes a selector component 116 that selects a content item (managed by the internal content item manager 1 108 or the internal content item manager 2 110) that may be suitable to responding to a request. For example, computing devices representing a content item provider 1 118, a content item provider 2 120, a content item provider 3 122, or a content item provider 4 124 may provide content items that may be selected in response to a request.

A content item provider is an entity that supplies content items that may be selected for display in response to a request. Different entities may be content item providers. Some examples of entities include organizations, advertisers, persons, companies, and many other types of entities. The content item provider may provide various pieces of information to generate content items, such as media items that are put together to form a content item, or complete content items themselves. The content item provider may provide one or more media items of different types. In an embodiment, the content item providers may also be referred to as bidders, whom specify a resource amount (e.g., a bid of a specified sum of money) to obtain the right to present their content items in response to requests.

In an embodiment, the request intermediary processing system 100 may include one or more internal content item managers with content item providers divided using different technical criteria, business rules, or other criteria. For example, internal content item campaigns may specialize in native content items, video content items, banner content items, text content items, multi-type content items, an embedded content item, a graphic content item, or any combination of these. When a request is for a video content item, only internal content item managers that are associated with a content provider with video content items need to be considered as to whether they satisfy the request. By separating the internal content item managers according to their respective purposes, the request intermediary processing system 100 may reduce time needed to respond to a request because only a subset of content items (e.g., those belonging to the relevant content item type or category) need to be searched.

Further, maintenance or updating of content items may be achieved by allowing identification or updates to only internal content item managers that are affected by the changes to the request intermediary processing system 100. For example, if video content items need to go through routine maintenance to verify video integrity, determine compatibility with different computing devices, or require updating, only a subset of the internal content item managers may be affected, while allowing regular operations of unaffected internal content item managers.

A token creator component 126 is responsible for including one or more pieces of tracking data embodied as tokens with a response to a request. For example, if a content item from the content item provider 1 118 has been selected by the selector component 116 to possibly provide in response to a request, then a URL or other tracking information from the content item provider 1 118 may be included in the response, so that the content item provider 1 118 may track whether their response was successful. The URL or other tracking information may be generated by the content item provider 1 118 when a content item campaign is created. The tracking information may in turn be processed when an external exchange selects the response, when an external exchange selects any response for a particular request, or any set period of time (e.g., every 15 seconds, minute, or other interval of time).

The token creator component 126 may determine which tokens are from the content item provider 118, which are included when the token creator component 126 generates updated responses. Further, the token creator component 126 determines what tokens are to be added for the request intermediary processing system 100 so that the request intermediary processing system 100 may track the performance of the response.

In an embodiment, the request intermediary processing system 100 uses one or more tracking tokens, included with a response to a request, to provide the tracking and analytics features of the request intermediary processing system 100. The tracking token may be implemented by any suitable method so that the response is uniquely identifiable by the tracking token. Tokens may represent the data itself needed to track performance or, as described elsewhere, tokens may represent a placeholder that references information stored separately from the response.

Each tracking token may include a variety of information. In an embodiment, tokens may be divided into two or more categories, such as provider-specific tokens (i.e., that are associated with specific content item campaigns) and system-specific tokens (i.e., that are associated with request intermediary processing system 100). TABLE 1 shows an example embodiment of a format that information included in a response may be represented, where the one or more tokens are included or embedded with a response URL.

TABLE 1

| Example format for a response URL including multiple tokens |
| --- |
| (1) domain + (2) downstream or content item campaign tracking tokens + (3) request intermediary processing system 100 tracking tokens + (4) supply tracking tokens |

In an embodiment, the supply tracking tokens may include information from an external exchange. The information may include details that are known only after the response has been selected. For example, a response to a request may include a number that indicates a maximum amount of how much of a resource associated with a content item campaign may be expended. The supply tracking tokens may include one or more pieces of information related to the request, such as how much of the maximum amount of the resource was needed for the response to be selected by the external exchange. The needed amount may be less than the maximum amount.

TABLE 2 below includes an example of how a response URL, using the example format identified in TABLE 1, may appear. The response URL may be triggered by an external exchange or a publisher automatically (e.g., when the response URL results in a winning bid) or manually (e.g., a set period of time, a set number of wins).

TABLE 2

| Example of a response URL embedded with multiple tokens |
| --- |
| http://responsetracker.com/win?trk=abc&action=win&laxrid=123&laxbid=1&laxeid=2& laxerid=1234&ii=${AUCTION_IMP_ID}&aui=${AUCTION_ID}&si=${AUCTION_S EAT_ID}&abi=${AUCTION_BID_ID}&wp=${AUCTION_PRICE}&pay=${AUCTIO N_VISIBLE}&curr=${AUCTION_CURRENCY}&aid=${AUCTION_AD_ID} where (1) the domain corresponds to "responsetracker.com," (2) the content item campaign tracking token corresponds to "win?trk=abc&action=win," (3) the request intermediary processing system 100 tracking token corresponds to "laxrid=123&laxbid=1&laxeid=2&laxerid=1234," (4) the supply tracking token corresponds to "ii=${AUCTION_IMP_ID}&aui=${AUCTION_ID}&si=${AUCTION_SEAT_ID}&ab i=${AUCTION_BID_ID}&wp=${AUCTION_PRICE}&pay=${AUCTION_VISIBLE} &curr=${AUCTION_CURRENCY}&aid=${AUCTION_AD_ID}." |

In alternate embodiments, the request intermediary processing system 100 may be adapted to work with a single token. For example, instead of including information in multiple tokens (e.g., content item campaign tracking token, request intermediary processing system 100 tracking token, supply tracking token) as separate tokens, the information from each token may be combined as a single token. The single token may include each respective piece of information in a hybrid approach where one or more pieces of information are mixed together.

2.1.1 Provider-Specific Token

In an embodiment, a response to a request from an external exchange includes one or more provider-specific tokens in response to a request. A response may include a provider-specific token that is copied directly from tracking information included in a content item campaign. The provider-specific token may be embedded into the response.

In an embodiment, the one or more provider-specific tokens are in a "black box" relative to the request intermediary processing system 100. This means that, although the request intermediary processing system 100 may be able to identify tokens included with a response that are provider-specific tokens, the request intermediary processing system 100 may not be able to understand the information that is represented by the one or more tokens themselves.

2.1.2 Request Intermediary Processing System-Specific Token

In an embodiment, a response to a request includes one or more system-specific tokens in response to a request. The system-specific tokens are in addition to, and separate from, provider-specific tokens in a response. TABLE 3 provides a description of tokens that may be included with a response, such as system-specific tokens used to track responses to requests in the request intermediary processing system 100.

TABLE 3

Example of tokens provided in a response and associated description

| Token Information | Description |
| --- | --- |
| Request Identifier | Identifies, for the request intermediary processing system 100, a unique content item request |
| Bidder Identifier | Identifies, for the request intermediary processing system 100, a content item campaign or bidder that provides a content item |
| Exchange Identifier | Identifies, for the request intermediary processing system 100, which external exchange provides a request |
| Exchange Request Identifier | Identifies, for the external exchange, a unique content item request |

An optional URL cache creator component 128 is responsible for shortening URLs used in the request intermediary processing system 100. Instead of including, in a response, all the information required by the request intermediary processing system 100, the URL cache creator component 128 removes information in a URL and instead includes a placeholder that references the removed information, so that none of the original information is lost. For example, a different embodiment of the request intermediary processing system 100 may potentially result in long URLs (e.g., address with many characters). There may be technical limitations as to a maximum length possible for a URL (e.g., 2,083 characters, 2,048 characters) or other considerations that limit the length of a URL. An example of another consideration is that it may be best to obscure tracking token information, to hide potentially private information from being included with a URL. Since URLs are generally transmitted without encryption (e.g., plain-text format), if the URL is intercepted, this may result in information unintentionally intercepted for malicious purposes.

Further, there may be other practical considerations as to why the URL cache creator component 128 is included in the request intermediary processing system 100. For example, although long URLs may be allowed, it may be impractical to include all pieces of information in a URL. Very long URLs may cause unintended slowdowns, such as when browser processing delays or transmitting long URLs result in extended response and reply times.

2.2 Tracker Component

Tracker component 114 includes an analytics component 132 that provides analytics on the outcomes of responses to requests received and processed by the request intermediary processing system 100. For example, the logging component 112 provides an updated response. The updated response may be used by the tracker component 114 to determine tracking data that includes outcome information based on a content item request. Examples of analytics that may be provided by the request intermediary processing system 100 using different pieces of tracking data collected by the request intermediary processing system 100 and metrics possible are included in TABLE 4 below.

TABLE 4

| Information Required | Metrics Possible |
| --- | --- |
| Request or Response Log | Sniff traffic from external exchanges. Determine which external exchanges have the most requests for content, types of content requests, and other information. |
| | Offline analysis for publisher quality control. Determine, based on requests from external exchanges, which publishers have valuable requests (e.g., highest resource amount associated with request, highest rate of prevailing at the external exchange). |
| | Offline analysis for inventory performance and volume. |
| Content Item Campaign Identifiers | Offline/online analysis for content item campaign quality and ranking. Determine which content item campaigns are the most valuable (e.g., highest resource amount associated with request, highest rate of a successful response). |
| | Internal auction and consolidated responses from multiple content item providers. Determine, from each internal content item manager individually and from the internal content item managers collectively, which content item providers are most successful. |

TABLE 4-continued

| Information Required | Metrics Possible |
| --- | --- |
| Response Results (e.g., whether response is accepted, whether response results in an impression, whether response results in a click or acceptance of response presented) | Success metrics. Determine successful outcome metrics based on impression and/or click per exchange, per app, per category, per campaign, per internal content item manager, per day, or any other metric. For example, outcome information for a single content item campaign used to respond to requests from when two or more external exchanges may be compared. As another example, outcome information for two or more content item campaigns used to respond to requests from an external exchange may be compared. As another example, outcome information for multiple internal campaign item managers may be compared. |

An optional URL cache retrieval component 134 is responsible for retrieving information in a shortened URL. For example, the URL cache creator component 128 may create a shortened URL by using a placeholder to substitute one or more pieces of information found in an original URL. The placeholder is converted by the URL cache retrieval component 134 back into the information before it was shortened.

A downstream adaptor component 136 is responsible for identifying, based on provider-specific information included with a response, to which content item provider to return information. For example, a response may include one or more provider-specific tokens. The downstream adaptor component 136 may use one or more other tokens, such as request intermediary processing system 100-specific tokens, to identify from among the different content item providers, which content item provider corresponds to the response. For example, the content item provider 2 120 was selected to provide a content item in response to a request. Once an outcome to the response is received (e.g., impression, click-through, winning bidder), the outcome is returned to the request intermediary processing system 100. The request intermediary processing system 100 may retrieve, using the downstream adaptor component 136, an adapter that properly formats the outcome information for the content item provider 2 120. Formatting may include removing, from the outcome information, request intermediary processing system 100-specific tokens. Formatting may also include formatting the outcome information so that it is properly routed to the content item provider 2 120, such as including the proper domain for the content item provider 2 120.

2.3 Related Systems Usable with a Request Intermediary Processing System

Embodiments of the request intermediary processing system 100 may include additional systems that increase the efficiency or capabilities of the request intermediary processing system 100 when responding to requests. For example, the request intermediary processing system 100 may be included in a request processing system that is used in conjunction with one or more of a request filtration system, a content item generation system, or a media item cache manager system, which are not shown in FIG. 1.

The request filtration system may be responsible for reducing load in the request processing system, by reducing the number of requests to which the request processing system responds. For example, the request filtration system implements techniques to reduce load on a downstream service by filtering requests before they are processed by the downstream service. The request filtration system may be used by the request processing system to eliminate requests that satisfy one or more filters. Each filter may specify one or more attributes that may apply to one or more requests. If a request satisfies any applicable filter, then the request is not considered by the downstream service or a content item does not need to be selected by the request processing system in response to the request.

An example of the request filtration system that may be used with the request processing system is described in the related U.S. Patent Application titled "Reducing Load to Downstream Services by Filtering Requests," as identified above in the Related Cases section of this application.

The media item cache manager system is responsible for efficiently using cache memory to respond to requests received by a request processing system. For example, a response to a request may include a content item generated using one or more media items. The cache memory may include information on media items along with a status indicator for each of the media items, indicating different status information. Some examples of possible status indicators include valid, invalid, or in-progress indicators.

An example of the media item cache manager system that may be used with the request processing system is described in the related U.S. Patent Application titled "Using Status Indicators in an Item Caching Environment," as identified above in the Related Cases section of this application.

3.0 Example Method for Logging in a Request Intermediary Processing System

Figure 2:
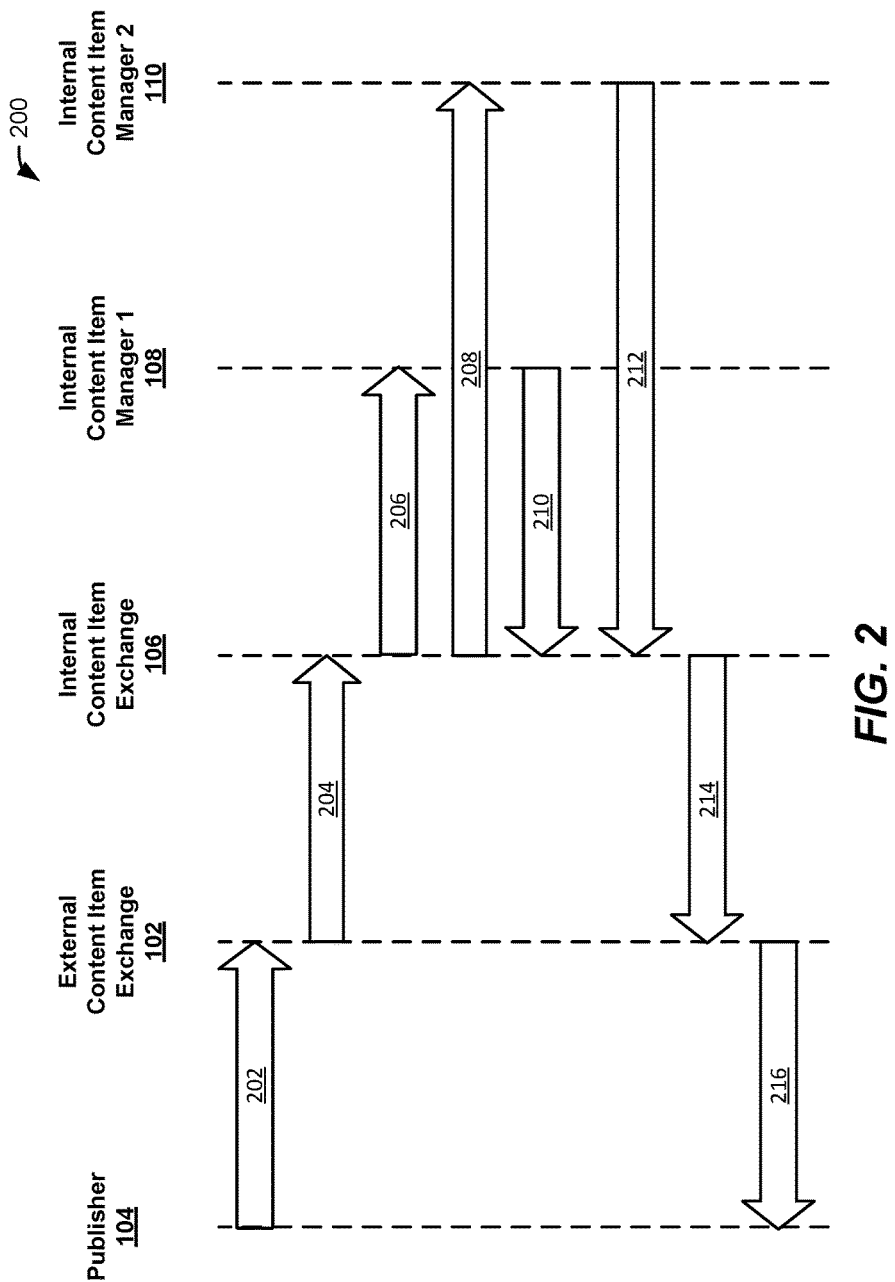
FIG. 2 depicts a time chart of steps taken when logging features are included by the request intermediary processing system, in an embodiment.
Figure 3:
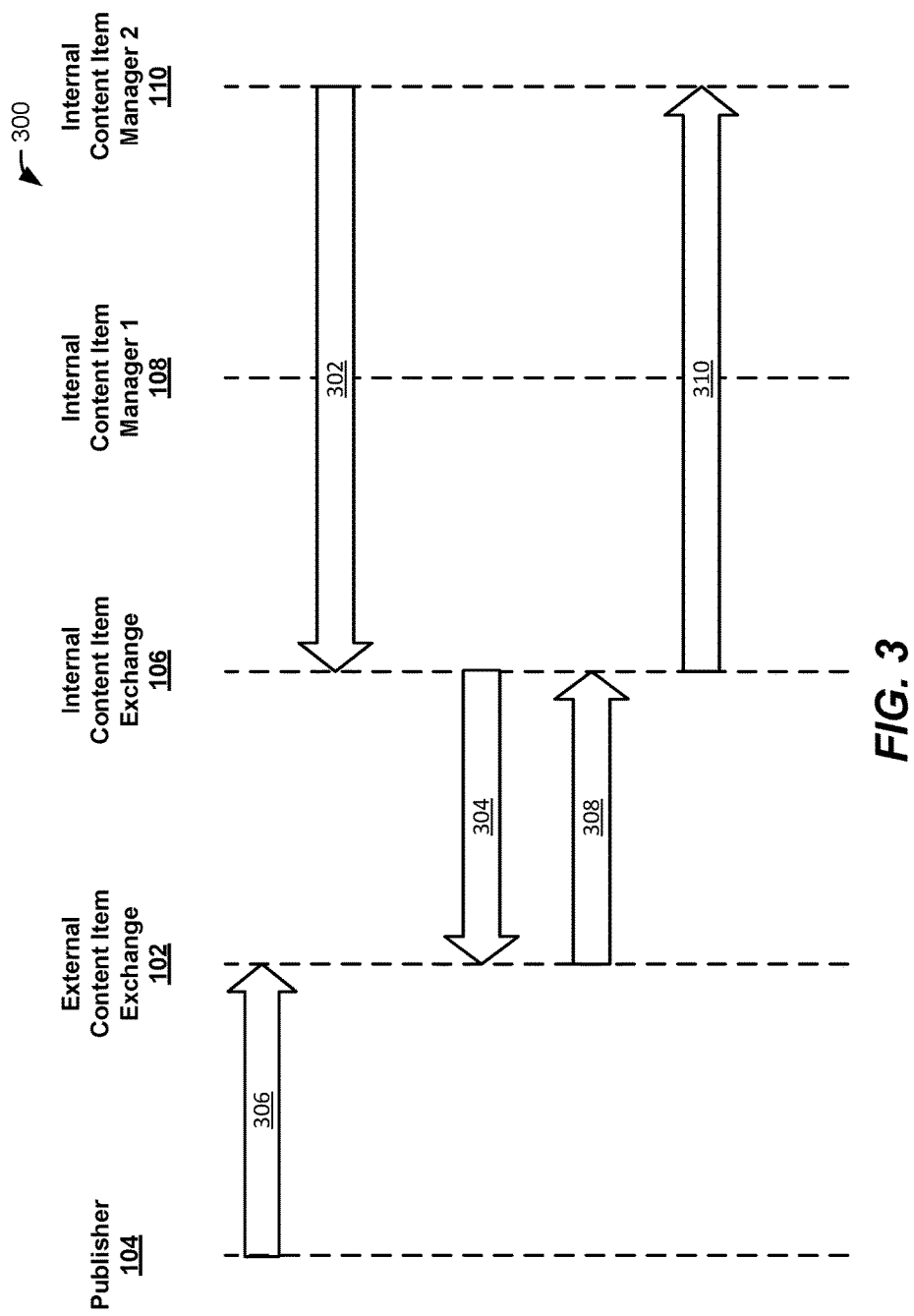
FIG. 3 depicts a time chart of steps taken when tracking features are activated by the request intermediary processing system, in an embodiment.

FIGS. 2 and 3 are time charts that illustrate an example method of logging and tracking requests made through an intermediary in the request intermediary processing system 100.

For purposes of illustrating a clear example, FIGS. 2 and 3 are described herein in the context of FIG. 1, but the broad principles of FIGS. 2 and 3 can be applied to other systems having configurations other than as shown in FIG. 1. Further, FIGS. 2 and 3 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIGS. 2 and 3 are intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

The time chart 200 of FIG. 2 depicts tasks when logging features are included in a response by the request intermediary processing system 100, in an embodiment. Different entities and/or computing devices associated with the different entities as shown in FIG. 1, including the publisher 104, the external content item exchange 102, the internal content item exchange 106 the internal content item manager 1 108, and the internal content item manager 2 110, are shown to illustrate an example of how tracing information is included with responses from the request intermediary processing system 100.

In step 202, the publisher 104 transmits a request to the external content item exchange 102 for a content item. In step 204, the external content item exchange 102 transmits a message to the internal content item exchange 106 that there is an opportunity to present a content item to a user.

In steps 206 and 208, the internal content item exchange 106 transmits the request to the internal content item manager 1 108 and the internal content item manager 2 110. For example, the internal content item exchange 106 may determine the internal content item manager 1 108 and the internal content item manager 2 110 satisfies one or more criteria established in the request, so that they may possibly be used to respond to the request. For example, if the request is a request for a content item that contains video, then the internal content item manager 108 and the internal content item manager 110 may be among one or more internal content item managers of the request intermediary processing system 100 that may provide content items having video.

In steps 210 and 212, each of the internal content item manager 1 108 and the internal content item manager 2 110 transmits a message indicating whether any of the content item campaigns managed by the respective managers may be used to respond to the request. If they include suitable content items to respond to the request, then each manager may identify content item related information, such as an identification of the content item, a resource amount willing to be used if the content item is selected by the external exchange, and one or more pieces of information (or tokens) used to track the performance of the content item for the request. For example, the internal content item manager 1 108 may select a content item campaign from the content item provider 2 120 as possibly satisfies the request while the internal content item manager 2 110 selects a content item campaign from the content item provider 3 122 as possibly satisfying the request.

The internal content item exchange 106 selects one of the internal content item manager 1 108 or the internal content item manager 2 110 for use in responding to the request. In this example, the internal content item manager 2 110 is selected as part of the request intermediary processing system 100's response to the request. A response to the request is generated by the internal content item exchange 106. The response may include information identifying the content item provider 3 122 as being used to satisfy the request, as well as tracking information (or tokens) provided by the content item provider 3 122 to track the outcome of the response. The response may also include information identifying which content item from the content item provider 3 122 is associated with the response, as well as information where the content item may be retrieved. Additionally or alternatively, the response may include the content item itself, including all or a subset of the media items used to render the content item on a screen. The internal content item exchange 106 may modify or add to the response request intermediary processing system 100-specific information, so that the request intermediary processing system 100 may independently track the progress or outcome of the response.

In step 214, the internal content item exchange 106 transmits the response to the external content item exchange 102. If the external content item exchange 102 selects the response corresponding to the content item provider 3 122, then, in step 216, the external content item exchange 102 transmits, to the publisher 104, information identifying the content item (or the content item itself).

4.0 Example Method for Tracking in a Request Intermediary Processing System

The time chart 300 of FIG. 3 depicts tasks when tracking features are included in a response by the request intermediary processing system 100, in an embodiment. As one example, FIG. 3 may be considered a continuation of the time chart shown in FIG. 2, but the steps as shown in FIG. 3 are not necessarily dependent on those shown in FIG. 2.

In optional step 306, the publisher 104 transmits, to the external content item exchange 102, outcome information automatically, based on a response to a request. This step may occur in response to the step 216 of FIG. 2. For example, this may include information indicating that the response from the content item provider 3 122 was selected for presentation by the external content item exchange 102 resulted in an impression, resulted in a click, and/or other outcome of the response. Step 306 is an optional step since, if the external content item exchange 102 did not select the content item from the content item provider 3 122, then the publisher 104 may not have any information to provide.

In optional step 302, the internal content item manager 2 110 transmits, to the internal content item exchange 106, an indication that the internal content item manager 2 110 or the content item provider 3 122 would like outcome information for responses to the request. This indication may be part of a polling request (e.g., request outcome information after a predetermined period of time) or manually when the outcome information is desired.

In optional step 304, the internal content item exchange 106 transmits, to the external content item exchange 102, the indication that outcome information is desired. Whether the indication is transmitted to the publisher 104 or the external content item exchange 102 may be dependent on which entity provides outcome information.

In step 308, the external content item exchange 102 transmits, to the internal content item exchange 106, outcome information. This may include the outcome information received in the step 306. The outcome information may use information included in the response. For example, the response to the request may include a URL. The URL may be updated to include information, such as supply tracking tokens, and triggered.

In step 310, the internal content item exchange 106 transmits the outcome information to the internal content item manager 2, such as by using the triggered URL in step 308. For example, the internal content item exchange 106 analyzes the outcome information to determine, based on request intermediary processing system 100-specific tokens included with the outcome information, that the internal content item manager 2 110 is associated with the outcome information.

In an optional step not shown in FIG. 3, the internal content item manager 2 transmits to the content item provider 3 122 the outcome information. The outcome information may include removing request intermediary processing system 100-specific information, but retaining provider-specific information that is associated with (e.g., identifies) the content item provider 3 122.

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
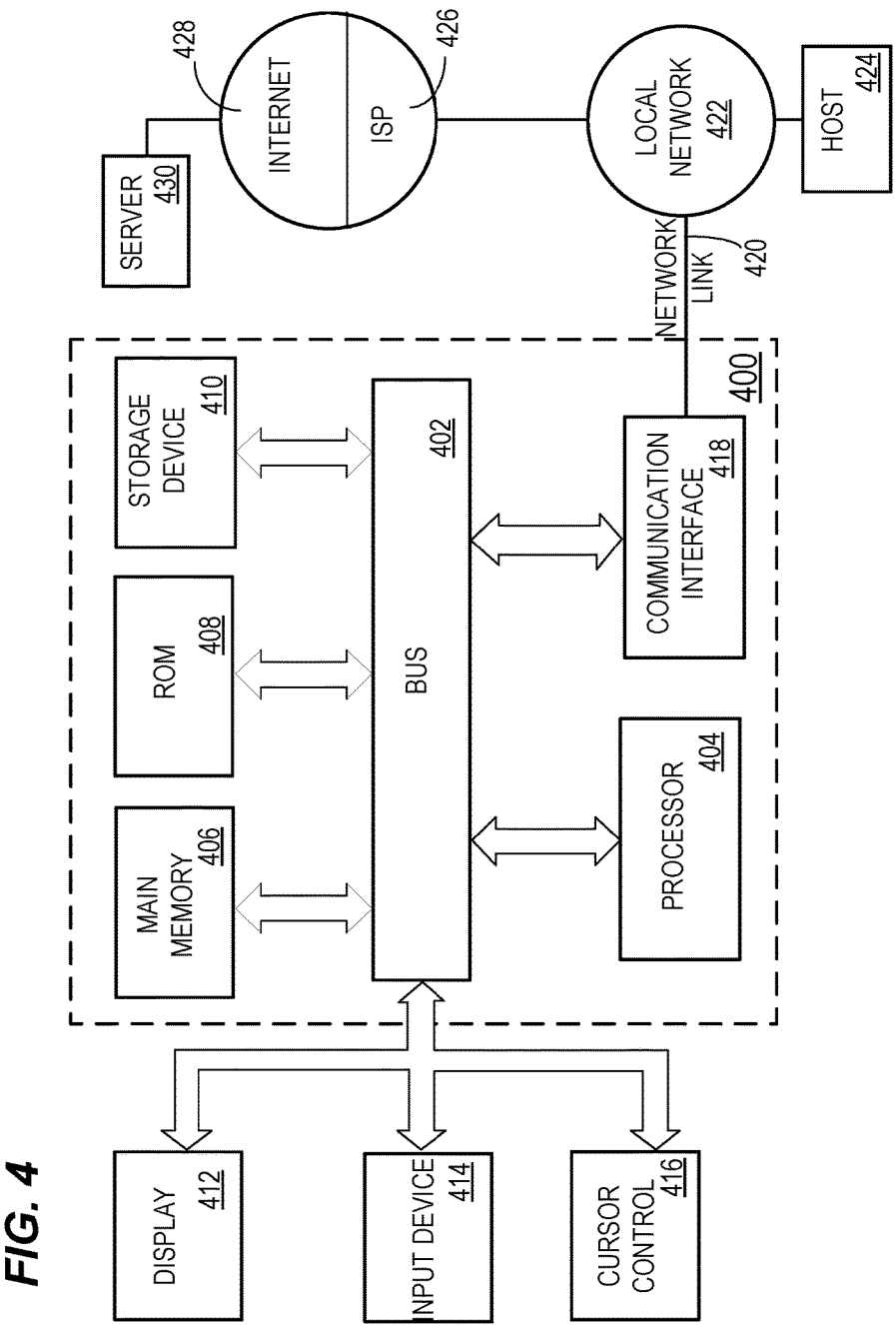
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, from an external exchange, over a network, at an internal exchange, a request for a content item;
    in response to receiving the request:
        determining, by the internal exchange, that a first internal content item manager of a plurality of internal content item managers may satisfy the request, wherein each internal content item manager of the plurality of internal content item managers manages multiple content item campaigns, and each content item campaign is associated with a strict subset of a plurality of content item categories;
        determining, by the first internal content item manager, that a first content item campaign satisfies the request;
        generating a response, to the request, that includes information identifying the first content item campaign;
        inserting, into the response, internal exchange specified information that includes an external exchange-specific request identifier provided by the external exchange and an internal content item manager-specific identifier that identifies the first internal content item manager;
        after inserting the internal exchange specified information into the response, transmitting the response to the external exchange.

2. The method of claim 1, wherein before inserting, the response includes content item campaign specific information that is different than the internal exchange specified information.

3. The method of claim 2, further comprising:
    identifying, within tracking data, the internal exchange specific information that was included in the response, without using the content item campaign specific information.

4. The method of claim 1, wherein the internal exchange handles requests from the external exchange for content items that may be satisfied by content item campaigns managed by the plurality of internal content item managers.

5. The method of claim 1, wherein determining, by the internal exchange, that the first internal content item manager may satisfy the request comprises:
    retrieving, by the internal exchange, information that specifies supported media types of each of the plurality of internal content item managers; and
    selecting, based on a supported media type for the first internal content item manager and a media type specified in the request, the first internal content item manager.

6. The method of claim 5, wherein the supported media type comprises at least one of a banner content item, a video, an embedded content item, text, or graphic.

7. The method of claim 1, further comprising:
    determining, by the internal exchange, that a second internal content item manager of the plurality of internal content item managers may satisfy the request;
    determining, by the second internal content item manager, that a second content item campaign satisfies the request;
    after determining that the second content item campaign satisfies the request, selecting, by the internal exchange, the first content item campaign instead of the second content item campaign to use to respond to the request.

8. The method of claim 1, wherein each content item campaign of the multiple content item campaigns is associated with exactly one of the plurality of internal content item managers.

9. The method of claim 1, further comprising:
    causing, based on the response, tracking data indicating an outcome of the response to be generated;
    receiving the tracking data and determining the outcome of the response.

10. The method of claim 1, wherein the plurality of internal content item managers comprise a first server and a second server corresponding to the first internal content item manager and a second internal content item manager, respectively, and the first content item campaign is managed by the first internal content item manager instead of the second internal content item manager based at least in part on a geographic distance of the first server to a server of the internal exchange relative to a geographic distance of the second server to a server of the external exchange.

11. The method of claim 1, further comprising:
    causing a content item associated with the first content item campaign and identified by the response to be presented on a user's computing device.

12. The method of claim 1, wherein the internal exchange transmits, to the external exchange, at least one keep alive message separate from the response.

13. The method of claim 1, further comprising:
    receiving, over the network, at the internal exchange, a second request for a content item;
    determining by the internal exchange, that a second internal content item manager of the plurality of internal content item managers may satisfy the second request,
    wherein the second internal content item manager is different than the first internal content item manager;
    determining, by the second internal content item manager, that a second content item campaign satisfies the second request;
    generating a second response that includes second information identifying the second content item campaign;
    inserting, into the second response, second internal exchange specific information that includes at least two request identifiers, a first external exchange-specific request identifier provided by the external exchange and a second internal content item manager-specific identifier that identifies the second internal content item manager and that is different than the first external exchange-specific request identifier;

after inserting the second internal exchange specific information into the second response, transmitting the second response to the external exchange;

based on first tracking data that indicates whether the response was presented on a client device, calculating a first metric for the first internal content item manager;

based on second tracking data that indicates whether the second response was presented on a client device, calculating a second metric for the second internal content item manager;

presenting the first metric and the second metric concurrently on a screen of a computing device.

14. One or more storage media storing instructions which, when executed by one or more processors, cause:

receiving, from an external exchange, over a network, at an internal exchange, a request for a content item;

in response to receiving the request:
determining, by the internal exchange, that a first internal content item manager of a plurality of internal content item managers may satisfy the request,
wherein each internal content item manager of the plurality of internal content item managers manages multiple content item campaigns;
determining, by the first internal content item manager, that a first content item campaign satisfies the request;
generating a response, to the request, that includes information identifying the first content item campaign;
inserting, into the response, internal exchange specified information that includes an external exchange-specific request identifier provided by the external exchange and an internal content item manager-specific identifier that identifies the first internal content item manager;
after inserting the internal exchange specified information into the response, transmitting the response to the external exchange.

15. The one or more storage media of claim 14, wherein before inserting, the response includes content item campaign specific information that is different than the internal exchange specified information.

16. The one or more storage media of claim 15, wherein the instructions, when executed by the one or more processors, further cause:
identifying, within tracking data, the internal exchange specific information that was included in the response, without using the content item campaign specific information.

17. The one or more storage media of claim 14, wherein the internal exchange handles requests from the external exchange for content items that may be satisfied by content item campaigns managed by the plurality of internal content item managers.

18. The one or more storage media of claim 14, wherein determining, by the internal exchange, that the first internal content item manager may satisfy the request comprises:
retrieving, by the internal exchange, information that specifies supported media types of each of the plurality of internal content item managers; and
selecting, based on a supported media type for the first internal content item manager and a media type specified in the request, the first internal content item manager.

19. The one or more storage media of claim 18, wherein the supported media type comprises at least one of a banner content item, a video, an embedded content item, text, or graphic.

20. The one or more storage media of claim 14, wherein the instructions, when executed by the one or more processors, further cause:
determining, by the internal exchange, that a second internal content item manager of the plurality of internal content item managers may satisfy the request;
determining, by the second internal content item manager, that a second content item campaign satisfies the request;
after determining that the second content item campaign satisfies the request, selecting, by the internal exchange, the first content item campaign instead of the second content item campaign to use to respond to the request.

* * * * *